E. W. DAVIS.
PIPE COUPLING GASKET.
APPLICATION FILED AUG. 14, 1908.
1,083,350.
Patented Jan. 6, 1914.
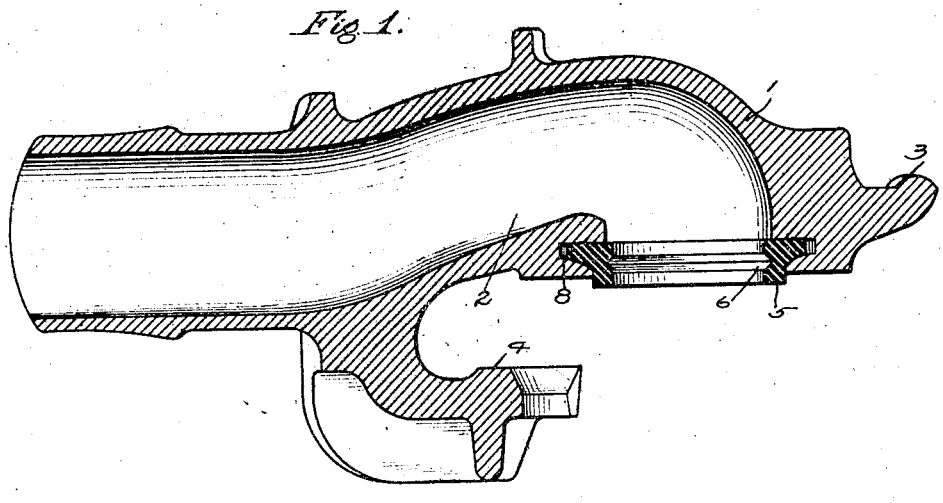
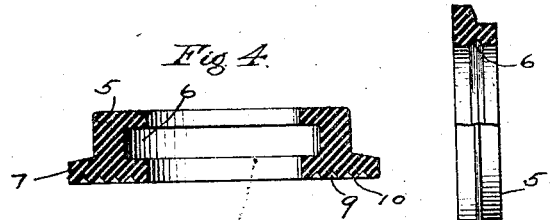
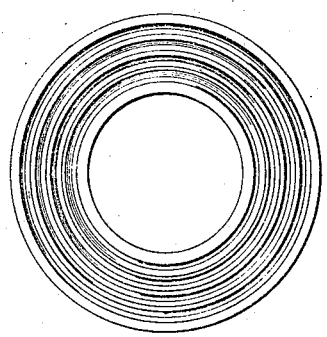
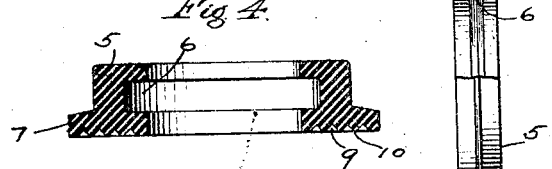
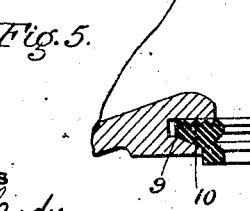
WITNESSES
Wm. M. Cady
J. S. Custer
INVENTOR
Edward W. Davis
by E. Wright
Att'y.

UNITED STATES PATENT OFFICE.

EDWARD W. DAVIS, OF HOLLIS, NEW YORK, ASSIGNOR TO WESTINGHOUSE AUTOMATIC AIR & STEAM COUPLER COMPANY, OF ST. LOUIS, MISSOURI, A CORPORATION OF MISSOURI.

PIPE-COUPLING GASKET.

1,083,350.

Specification of Letters Patent.

Patented Jan. 6, 1914.

Application filed August 14, 1908. Serial No. 448,475.

*To all whom it may concern:*

Be it known that I, EDWARD W. DAVIS, a citizen of the United States, residing at Hollis, in the county of Queens and State of New York, have invented new and useful Improvements in Pipe-Coupling Gaskets, of which the following is a specification.

This invention relates to pipe coupling gaskets, and more particularly to those adapted for use in connection with hand or automatic pipe couplings as employed between cars in railway trains to connect up the train pipe lines which carry air, steam and the like through the train.

Especially as to the train brake pipe, it is of prime importance that fluid tight joints be formed at the pipe couplings so as to prevent leakage of fluid under pressure and accordingly the principal object of my invention is to provide an improved form of gasket or packing ring for the coupling which is adapted to effectually prevent leakage even after the gasket has worn down considerably.

In the accompanying drawing, Figure 1 is a central sectional view of a standard hand operated pipe coupling head, showing one form of my improved gasket or packing ring applied thereto; Fig. 2 a side view of the gasket, partly broken away, so as to show the cross sectional contour thereof; and Figs. 3 and 4 a plan and transverse section respectively, showing a modified form of gasket.

Though adapted to be applied to automatic and other pipe couplings generally, I have shown the improved gasket mounted in a hand operated pipe coupling head 1 of the ordinary standard construction having a laterally opening fluid passage 2, at the mouth of which the head is provided with the usual circumferential groove or recess 8. A gasket or packing ring of flexible rubber or other material is sprung or forced into the groove 8, the face of the gasket being adapted to contact with the face of a gasket in a counterpart coupling head, upon coupling the heads together.

According to my improvement, a gasket 5 is provided which may be similar to the ordinary gasket in general contour, as shown in Fig. 2, but interiorly the gasket is provided with a circumferential groove or recess 6, preferably located about in line with the intersection of the gasket flange 7 with the body portion thereof. The groove or recess 6 may be of any suitable cross sectional shape, such as V shape as shown in Figs. 1 and 2, or U shape as shown in Figs. 3 and 4. The gasket so constructed is inserted in the groove 8 of the coupling head, as shown in Fig. 1, and upon coupling the head to a counterpart head the meeting face of the gasket contacts with the face of the companion gasket. Upon supplying fluid under pressure to the train line pipe, the same exerts its pressure in the groove or recess 6, and tends to force or press the outer lips of the gasket into tight engagement with the companion gasket. The fluid pressure thus firmly holds the gaskets in contact, and it has been found in practice, that the gasket faces may be considerably worn and still a fluid tight joint is maintained, while with the ordinary gasket after the same wears down the liability to leakage is greatly increased and it soon becomes necessary to apply new gaskets. The under or inner face of the gasket may be formed with a series of concentric circular grooves 9 making ridges or ribs 10 between the same which being firmly clamped against the metal face of the seat or groove in the coupling head makes a tight joint and prevents any leakage around the gasket.

It will be apparent that gaskets embodying my improvements may be produced without additional expense in the manufacture while possessing a considerably increased life and efficiency against leakage.

Having now described my invention, what I claim as new and desire to secure by Letters Patent, is:—

In a pipe coupling the combination with a coupling head or half section provided with a lateral opening in its face and a groove surrounding the same, of a cylindrical packing ring having a flange fitting said groove and provided with an interior circumferential recess subject to the pressure of the fluid passing through said opening, and with grooves and ribs on its inner face for engaging a face of the coupling head.

In testimony whereof I have hereunto set my hand.

EDWARD W. DAVIS.

Witnesses:
R. F. EMERY,
A. M. CLEMENTS.